US012548575B2

(12) United States Patent
Vilermo et al.

(10) Patent No.: US 12,548,575 B2
(45) Date of Patent: Feb. 10, 2026

(54) APPARATUS, METHODS AND COMPUTER PROGRAMS FOR CONTROLLING BAND LIMITED AUDIO OBJECTS

(71) Applicant: Nokia Technologies Oy, Espoo (FI)

(72) Inventors: Miikka Vilermo, Siuro (FI); Mikko Tammi, Tampere (FI); Mikko-Ville Laitinen, Espoo (FI); Jussi Virolainen, Espoo (FI); Juha Vilkamo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/261,633

(22) PCT Filed: Jul. 19, 2019

(86) PCT No.: PCT/FI2019/050554
§ 371 (c)(1),
(2) Date: Jan. 20, 2021

(87) PCT Pub. No.: WO2020/021162
PCT Pub. Date: Jan. 30, 2020

(65) Prior Publication Data

US 2021/0343296 A1 Nov. 4, 2021

(30) Foreign Application Priority Data

Jul. 24, 2018 (GB) ..................................... 1812038

(51) Int. Cl.

| | |
|---|---|
| ***G10L 19/008*** | (2013.01) |
| ***G10L 19/20*** | (2013.01) |
| ***H04S 7/00*** | (2006.01) |

(52) U.S. Cl.
CPC ............ *G10L 19/008* (2013.01); *G10L 19/20* (2013.01); *H04S 7/303* (2013.01); *H04S 7/305* (2013.01); *H04S 2400/11* (2013.01)

(58) Field of Classification Search
CPC ....... G10L 19/008; G10L 19/20; G10L 19/16; G10L 19/0204; G10L 19/0208;
(Continued)

(56) References Cited

U.S. PATENT DOCUMENTS

2006/0149402 A1* 7/2006 Chung .................... H04S 7/307 381/104
2006/0247918 A1 11/2006 Schmidt et al. .............. 704/200
2007/0039034 A1* 2/2007 Sokol ...................... H04S 3/008 725/147
2012/0230497 A1 9/2012 Dressler et al. ................ 381/22
(Continued)

FOREIGN PATENT DOCUMENTS

CN 1750124 A 3/2006
CN 102197662 A 9/2011
(Continued)

*Primary Examiner* — Leshui Zhang

(74) *Attorney, Agent, or Firm* — McCarter & English, LLP

(57) ABSTRACT

The application relates to apparatus, methods and computer programs for controlling band limited audio objects. The example apparatus includes circuitry configured for: obtaining a band limited audio object comprising one or more parameters; obtaining spatial metadata associated with the band limited audio object; determining a position of a user; and using the determined position of the user and the spatial metadata associated with the band limited audio object to control at least one of the parameters of the band limited audio object.

18 Claims, 8 Drawing Sheets

(58) Field of Classification Search

CPC ....... G10L 19/00; G10L 19/167; G10L 19/22; G10L 25/12; G10L 19/022; G10L 25/21; H04S 7/30; H04S 7/303; H04S 7/302; H04S 7/308; H04S 7/00; H04S 7/305; H04S 7/304; H04S 2400/11; H04S 2400/13; H04S 2400/15; H04S 2400/07; H04S 2420/03; H04S 2420/07; H04S 3/008; H04S 3/00; H04S 7/307; H04S 2400/01; H04S 2400/05; H04S 1/00; H04S 2420/01; H04S 7/306; G06F 3/165; G06F 3/167; G06F 3/011

USPC ......... 704/500–504; 381/1–23, 333, 306, 74, 381/23.1, 300–301, 302, 303, 304, 305, 381/309, 310, 311, 26, 27, 56, 57, 61, 63, 381/66, 77, 82, 83, 86, 92, 102, 103, 104, 381/105, 106, 107, 108, 111, 122, 119, 381/118; 700/94

See application file for complete search history.

(56) References Cited

U.S. PATENT DOCUMENTS

| | | | | |
|---|---|---|---|---|
| 2014/0064517 | A1* | 3/2014 | Ko | H04N 13/268 381/98 |
| 2015/0104037 | A1* | 4/2015 | Lee | H04S 7/308 381/80 |
| 2015/0223002 | A1 | 8/2015 | Mehta et al. | |
| 2017/0347219 | A1 | 11/2017 | McCauley et al. | 7/304 |
| 2018/0098173 | A1* | 4/2018 | van Brandenburg | H04S 7/303 |

FOREIGN PATENT DOCUMENTS

| | | | |
|---|---|---|---|
| CN | 106170992 | A | 11/2016 |
| EP | 2 320 415 | A1 | 5/2011 |
| EP | 2 891 338 | | 3/2014 |
| WO | WO-2009/128859 | A1 | 10/2009 |
| WO | WO2015/066062 | A1 | 5/2015 |
| WO | WO-2016/075053 | A1 | 5/2016 |

* cited by examiner

APPARATUS, METHODS AND COMPUTER PROGRAMS FOR CONTROLLING BAND LIMITED AUDIO OBJECTS

CROSS REFERENCE TO RELATED APPLICATION

This patent application is a U.S. National Stage application of International Patent Application Number PCT/FI2019/050554 filed Jul. 19, 2019, which is hereby incorporated by reference in its entirety, and claims priority to GB 1812038.6 filed Jul. 24, 2018.

TECHNOLOGICAL FIELD

Examples of the present disclosure relate to apparatus, methods and computer programs for controlling band limited audio objects. Some relate to apparatus, methods and computer programs for providing directional control of band limited audio objects

BACKGROUND

Band limited audio objects such as low frequency effect audio objects may require specific speakers to enable the audio within the frequency bands to be rendered. This may need to be taken into account when spatial audio is being rendered to a user. A sound system may contain fewer speakers for rendering low frequency effect audio objects than for rendering other types of audio object.

BRIEF SUMMARY

According to various, but not necessarily all, examples of the disclosure there may be provided, an apparatus comprising means for: obtaining a band limited audio object comprising one or more parameters; obtaining spatial metadata associated with the band limited audio object; determining a position of a user; and using the determined position of the user and the spatial metadata associated with the band limited audio object to control at least one of the parameters of the band limited audio object.

The spatial metadata may be obtained with the band limited audio signal.

The spatial metadata may be stored with a non-band limited audio object and the band limited audio object may be obtained with metadata indicative of the non-band limited audio object. The metadata obtained with the band limited audio object may be indicative of a connection between the band limited audio object and the non-band limited audio object. The band limited audio object and the non-band limited audio object may be configured to be played back at the same time.

The band limited audio object may comprise a low frequency effect audio object.

The band limited audio object may comprise a band limited audio object playback volume and/or a band limited audio object playback signal.

The band limited audio object may be configured to be played back via at least one band limited speaker.

The one or more parameters may comprise at least one of volume, delay, reverberation, diffusivity.

The means may be configured to determine the position of the user while the band limited audio object is being played back.

The position of the user may be determined relative to one or more speakers configured to play back the band limited audio object.

The position of the user may comprise the distance between the user and one or more speakers configured to playback the band limited audio object.

According to various, but not necessarily all, examples of the disclosure there may be provided, an apparatus comprising: processing circuitry; and memory circuitry including computer program code, the memory circuitry and the computer program code configured to, with the processing circuitry, cause the apparatus to: obtain a band limited audio object comprising one or more parameters; obtain spatial metadata associated with the band limited audio object; determine a position of a user; and use the determined position of the user and the spatial metadata associated with the band limited audio object to control at least one of the parameters of the band limited audio object.

According to various, but not necessarily all, examples of the disclosure there may be provided, an audio rendering device comprising an apparatus as described above.

According to various, but not necessarily all, examples of the disclosure there may be provided method comprising: obtaining a band limited audio object comprising one or more parameters; obtaining spatial metadata associated with the band limited audio object;

determining a position of a user; and using the determined position of the user and the spatial metadata associated with the band limited audio object to control at least one of the parameters of the band limited audio object.

The spatial metadata may be obtained with the band limited audio signal.

The spatial metadata may be stored with a non-band limited audio object and the band limited audio object may be obtained with metadata indicative of the non-band limited audio object.

According to various, but not necessarily all, examples of the disclosure there may be provided a computer program comprising computer program instructions that, when executed by processing circuitry, cause: obtaining a band limited audio object comprising one or more parameters; obtaining spatial metadata associated with the band limited audio object; determining a position of a user; and using the determined position of the user and the spatial metadata associated with the band limited audio object to control at least one of the parameters of the band limited audio object.

According to various, but not necessarily all, examples of the disclosure there may be provided a physical entity embodying the computer program as described above.

According to various, but not necessarily all, examples of the disclosure there may be provided an electromagnetic carrier signal carrying the computer program as claimed described above.

According to various, but not necessarily all, examples of the disclosure there may be provided apparatus comprising means for: obtaining a band limited audio object comprising one or more parameters; obtaining spatial metadata associated with the band limited audio object; determining a direction of a display associated with the band limited audio object; and using the spatial metadata associated with the band limited audio object to control one or more parameters of the band limited audio object in accordance with the determined direction of the display.

The one or more parameters may comprise a volume of the band limited audio object.

The determining a direction of a display may comprise determining whether the display is oriented within a threshold angular range wherein the threshold angular range is defined by the spatial metadata.

The means may be configured to control the one or more parameters of the band limited audio object in a first way if the display is oriented within the threshold angular range and control the one or more parameters of the band limited audio object in a second way if the display is not oriented within the threshold angular range.

According to various, but not necessarily all, examples of the disclosure there may be provided an apparatus comprising: processing circuitry; and memory circuitry including computer program code, the memory circuitry and the computer program code configured to, with the processing circuitry, cause the apparatus to: obtain a band limited audio object comprising one or more parameters; obtain spatial metadata associated with the band limited audio object; determine a direction of a display associated with the band limited audio object; and use the spatial metadata associated with the band limited audio object to control one or more parameters of the band limited audio object in accordance with the determined direction of the display.

According to various, but not necessarily all, examples of the disclosure there may be provided audio rendering device comprising an apparatus as described above.

According to various, but not necessarily all, examples of the disclosure there may be provided a method comprising: obtaining a band limited audio object comprising one or more parameters; obtaining spatial metadata associated with the band limited audio object; determining a direction of a display associated with the band limited audio object; and using the spatial metadata associated with the band limited audio object to control one or more parameters of the band limited audio object in accordance with the determined direction of the display.

The one or more parameters may comprise a volume of the band limited audio object.

According to various, but not necessarily all, examples of the disclosure there may be provided a computer program comprising computer program instructions that, when executed by processing circuitry, cause: obtaining a band limited audio object comprising one or more parameters; obtaining spatial metadata associated with the band limited audio object; determining a direction of a display associated with the band limited audio object; and using the spatial metadata associated with the band limited audio object to control one or more parameters of the band limited audio object in accordance with the determined direction of the display.

According to various, but not necessarily all, examples of the disclosure there may be provided a physical entity embodying the computer program as described above.

According to various, but not necessarily all, examples of the disclosure there may be provided an electromagnetic carrier signal carrying the computer program as described above.

According to various, but not necessarily all, examples of the disclosure there may be provided an apparatus comprising means for: obtaining a band limited audio object comprising one or more parameters; obtaining spatial metadata associated with the band limited audio object; and using metadata associated with the band limited audio object to control one or more parameters of the band limited audio object.

BRIEF DESCRIPTION

Some example embodiments will now be described with reference to the accompanying drawings in which.

DETAILED DESCRIPTION

Figure 1:
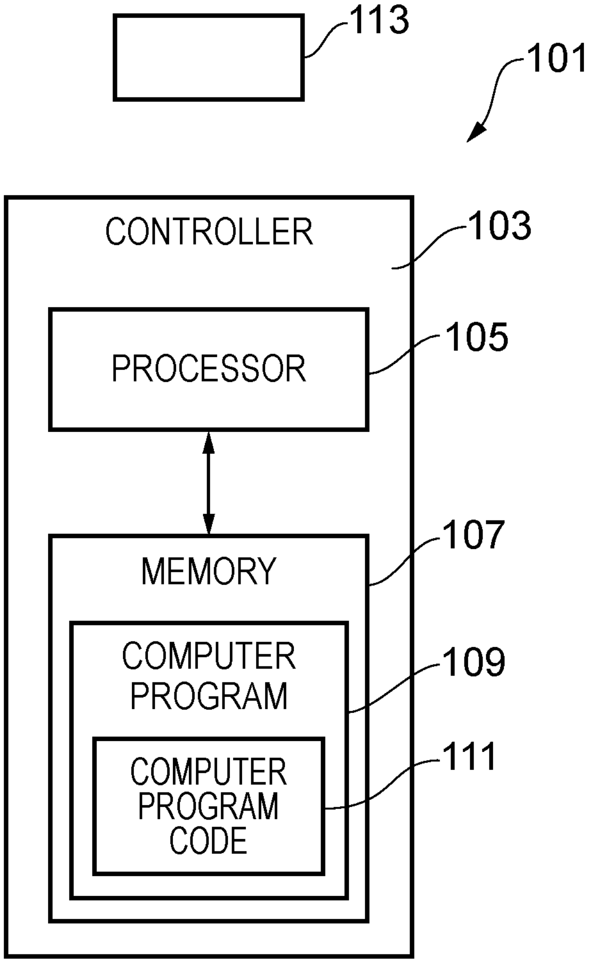
FIG. 1 shows an example apparatus.

The Figures illustrate an apparatus 101 comprising means for: obtaining 401 a band limited audio object 211 comprising one or more parameters and obtaining spatial metadata associated with the band limited audio object 211; determining 403 a position of a user 605; and using 405 the determined position of the user 605 to control at least one of the parameters of the band limited audio object 211. The parameters could comprise at least one of volume, delay, reverberation, diffusivity or any other suitable parameter. This provides the technical effect of enabling spatial control of band limited audio objects 211. This may provide for an improved spatial audio experience for a user 605. For example it may enable the band limited audio objects 211 to be controlled as the user 605 moves within an audio space to enable a more realistic audio signal to be provided to the user 605.

FIG. 1 schematically illustrates an apparatus 101 according to examples of the disclosure. In the example of FIG. 1 the apparatus 101 comprises a controller 103. In the example of FIG. 1 the implementation of the controller 103 may be as controller circuitry. In some examples the controller 103 may be implemented in hardware alone, have certain aspects in software including firmware alone or can be a combination of hardware and software (including firmware).

As illustrated in FIG. 1 the controller 103 may be implemented using instructions that enable hardware functionality, for example, by using executable instructions of a computer program 109 in a general-purpose or special-purpose processor 105 that may be stored on a computer readable storage medium (disk, memory etc) to be executed by such a processor 105.

The processor 105 is configured to read from and write to the memory 107. The processor 105 may also comprise an output interface via which data and/or commands are output by the processor 105 and an input interface via which data and/or commands are input to the processor 105.

The memory 107 is configured to store a computer program 109 comprising computer program instructions (computer program code 111) that controls the operation of the apparatus 101 when loaded into the processor 105. The computer program instructions, of the computer program 109, provide the logic and routines that enables the apparatus 101 to perform the methods illustrated in FIGS. 4, 5, 13 and 14 The processor 105 by reading the memory 107 is able to load and execute the computer program 109.

The apparatus 101 therefore comprises: at least one processor 105; and at least one memory 107 including computer program code 111, the at least one memory 107 and the computer program code 111 configured to, with the at least one processor 105, cause the apparatus 101 at least to perform: obtaining 401 a band limited audio object 211 comprising one or more parameters and also obtaining spatial metadata associated with the band limited audio object 211; determining 403 a position of a user 605; and using 405 the determined position of the user 605 and the obtained spatial metadata to control at least one of the parameters of the band limited audio object 211.

In some examples the apparatus 101 may comprise: at least one processor 105; and at least one memory 107 including computer program code 111, the at least one memory 107 and the computer program code 111 configured to, with the at least one processor 105, cause the apparatus 101 at least to perform: obtaining a band limited audio object comprising one or more parameters and also obtaining spatial metadata associated with the band limited audio object 211; determining a direction of a display associated with the band limited audio object 211; and using the spatial metadata associated with the band limited audio object 211 to control one or more parameters of the band limited audio object 211 in accordance with the determined direction of the display.

As illustrated in FIG. 1 the computer program 109 may arrive at the apparatus 101 via any suitable delivery mechanism 113. The delivery mechanism 113 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 109. The delivery mechanism may be a signal configured to reliably transfer the computer program 109. The apparatus 101 may propagate or transmit the computer program 109 as a computer data signal. In some examples the computer program 109 may be transmitted to the apparatus 101 using a wireless protocol such as Bluetooth, Bluetooth Low Energy, Bluetooth Smart, 6LoWPan ($IP_v6$ over low power personal area networks) ZigBee, ANT+, near field communication (NFC), Radio frequency identification, wireless local area network (wireless LAN) or any other suitable protocol.

The computer program 109 comprises computer program instructions for causing an apparatus 101 to perform at least the: obtaining 401 a band limited audio object 211 comprising one or more parameters wherein the band limited audio object 211 is configured to be played back via at least one band limited speaker and also obtaining spatial metadata associated with the band limited audio object 211; determining 403 a position of a user 605; and using 405 the determined position of the user 605 and the obtained spatial metadata to control at least one of the parameters of the band limited audio object 211.

In some examples the computer program 109 may comprise computer program instructions for causing an apparatus 101 to perform at least: obtaining a band limited audio object comprising one or more parameters wherein the band limited audio object 211 is configured to be played back via at least one band limited speaker and also obtaining spatial metadata associated with the band limited audio object 211; determining a direction of a display associated with the band limited audio object 211; and using the spatial metadata associated with the band limited audio object 211 to control one or more parameters of the band limited audio object 211 in accordance with the determined direction of the display.

The computer program instructions may be comprised in a computer program 109, a non-transitory computer readable medium, a computer program product, a machine readable medium. In some but not necessarily all examples, the computer program instructions may be distributed over more than one computer program 109.

Although the memory 107 is illustrated as a single component/circuitry it may be implemented as one or more separate components/circuitry some or all of which may be integrated/removable and/or may provide permanent/semi-permanent/dynamic/cached storage.

Although the processor 105 is illustrated as a single component/circuitry it may be implemented as one or more separate components/circuitry some or all of which may be integrated/removable. The processor 105 may be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 2:
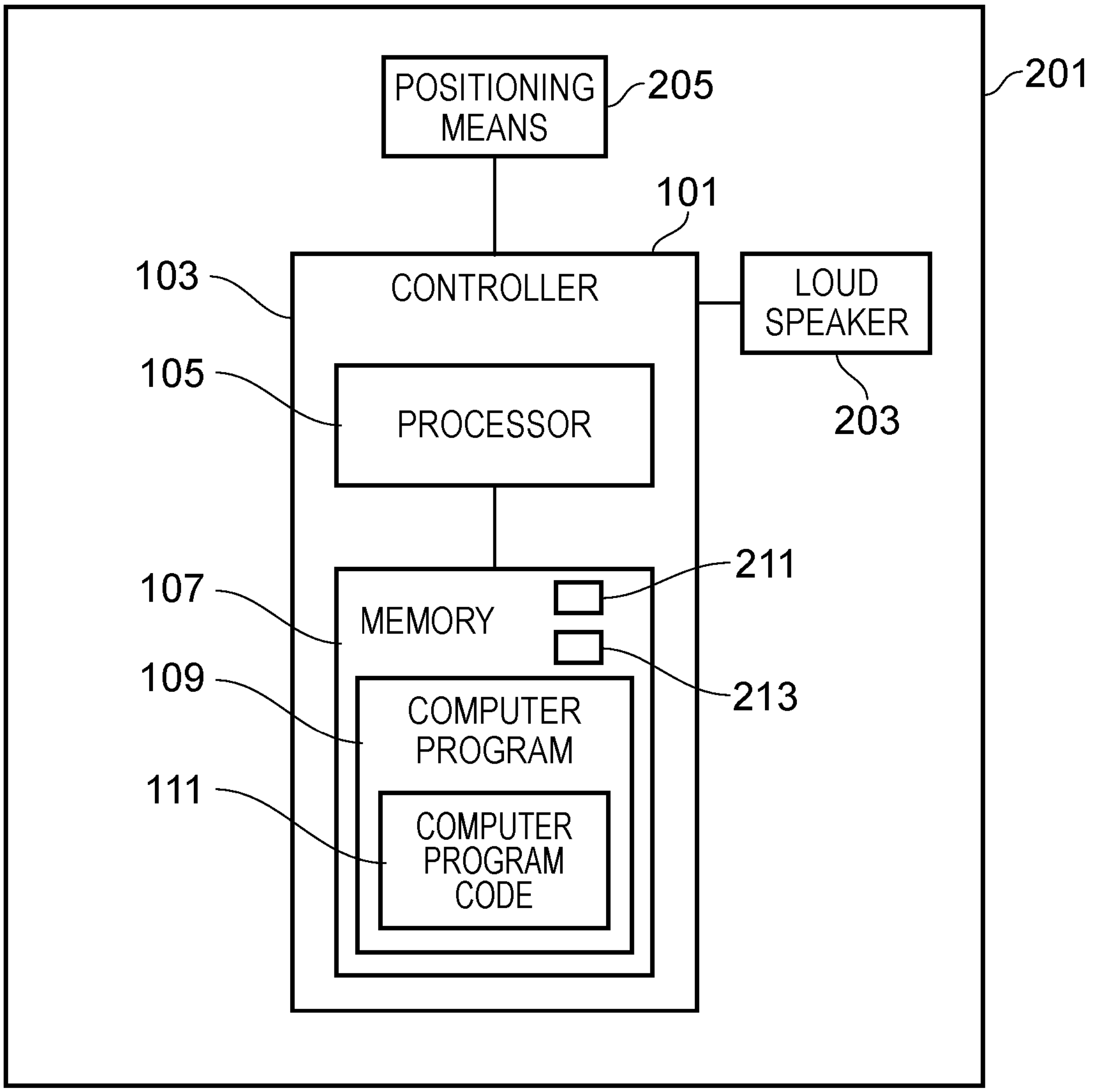
FIG. 2 shows an example device comprising an apparatus.

FIG. 2 shows an example device 201 comprising an apparatus 101. The device 201 could be an audio rendering device or any other suitable device. In the example of FIG. 2 the device 201 comprises an apparatus 101, at least one loudspeaker 203 and positioning means 205. It is to be appreciated that only components referred to in the following description are shown in FIG. 2 and that in implementations of the disclosure other components may be provided.

The apparatus 101 could be an apparatus 101 as shown in FIG. 1 and corresponding reference numerals are used for corresponding features.

The memory 107 may be configured to store information representing one or more band limited audio objects 211. A band limited audio object could be an object which has a bandwidth which is substantially narrower than normal human hearing range. A band limited audio object 211 could comprise a low frequency effect audio object. The low frequency object could comprise frequencies at the lower range of human hearing. A band limited audio object 211 may comprise only low frequency sounds. In some examples the band limited audio object 211 could be limited to a frequency range of 20-120 Hz. In some examples the lowest frequencies of the band limited audio object 211 could be between 10-50 Hz and in some examples the highest frequencies of the band limited audio object 211 could be between 50-120 Hz.

A band limited audio object 211 may be different from a non-band limited audio object in that a non-band limited audio object may cover all of, or almost all of, normal human hearing frequencies while the band limited audio object only covers a small range of these frequencies. The band limited audio object may be configured to be played back via at least one band limited speaker whereas the non-band limited audio object could be played back via at least one normal speaker.

The band limited audio object 211 may be associated with a spatial position. The spatial position could be the location of a sound source which generates the band limited audio object 211. In some examples the spatial position could be the direction from which the band limited audio object 211 is perceived to arrive. This could be affected by walls or other physical objects which could reflect or otherwise direct the sound.

The band limited audio object 211 may comprise a band limited audio object playback volume and/or a band limited audio object playback signal.

The band limited audio object 211 may comprise one or more different parameters. The parameters may be controlled to enable the spatial properties of the band limited audio object 211 to be recreated and perceived by a user 605. The different parameters could comprise any one or more of volume, delay, diffusivity, reverberation or any other parameter which is determined by the spatial properties of the band limited audio object 211.

The memory 107 may also be configured to store metadata 213. The metadata 213 may be stored with the band limited audio object 211. The metadata 213 may be stored with the band limited audio object 211 so that when the band limited audio object 211 is retrieved the metadata 213 can also be retrieved.

In some examples the metadata 213 could comprise spatial metadata. The spatial metadata may comprise information which enables spatial effects of the band limited audio object 211 to be recreated. For instance, it may comprise information indicative of how the volume, or other parameters, of the band limited audio object 211 should be controlled in dependence upon the user's position. The volume could be the loudness of the band limited audio object 211. The volume could be the gain applied to the band limited audio object 211. The position of the user 605 could be the angular orientation of the user 605 and/or the distance between the user 605 and a reference point. The reference point could be the rendering device 201 or any other suitable reference point. The spatial metadata could be obtained using a spatial audio capture system 301 such as the system shown in FIG. 3.

In some examples the metadata 213 may comprise information indicative of another audio object which is associated with the band limited audio object 211. The another audio object could be a non-band limited audio object. For example the non-band limited audio object may comprise high frequency sounds. The non-band limited audio object may comprise sounds that cover a normal range of hearing. The non-band limited audio object may comprise sounds that cover a frequency range of 20 Hz to 20 kHz. The ranges of frequencies covered by the non-band limited audio object could overlap with the ranges of frequencies covered by a band limited audio object 211. The another audio object could be stored in the memory 107 of the apparatus 101 or could be stored in the memory of a different device.

In some examples the band limited audio object 211 and the non-band limited audio object could be associated in that they may originate from the same sound source. For example a sound source could produce both low frequency sounds and higher frequency sounds. The low frequency sounds could be comprised within the band limited audio object 211 and the higher frequency sounds could be comprised within the non-band limited audio object.

In some examples the band limited audio object 211 and the non-band limited audio object could be associated in that they may originate from the same direction or a similar direction but could be generated by different sources. For example if the audio is used to recreate the sound of a battle scene the band limited audio object 211 could correspond to cannon fire while the non-band limited audio object could correspond to gun fire. These sounds could be generated by different sources but the sources may be located in the same or similar positions.

When the audio is being rendered both the band limited audio object 211 and the non-band limited audio object could be played back at the same time. The band limited audio object 211 and the non-band limited audio object could be played back via different speakers.

In these examples a single set of spatial metadata 213 could be stored. This could be stored with the non-band limited audio object. The metadata that is stored with the band limited audio object 211 could provide an indication of the non-band limited audio object which is associated with the band limited audio object 211 and could enable the spatial metadata 213 to be retrieved. This enables the same spatial metadata to be shared between two or more different audio objects. It is to be appreciated that the spatial metadata 213 could be stored with any one or more of the associated audio objects. This may reduce the amount of data that needs to be transmitted and/or stored.

The band limited audio object 211 may be obtained by the apparatus 101 by any suitable means. In some examples the apparatus may form part of a spatial audio capture system which may be configured to record and capture the band limited audio object 211 and other audio objects. In some examples the band limited audio object 211 may be received via a communication link and stored in the memory 107 of the apparatus 101.

The at least one loudspeaker 203 may comprise any means which enables an electrical input signal to be rendered into an audible output signal. In some examples the at least one loudspeaker 203 may comprise a band limited speaker which may be configured to provide a low frequency effect audible output signal. This may enable the band limited audio object 211 to be rendered to a user 605.

The at least one loudspeaker 203 may be coupled to the memory 107 to enable the band limited audio object 211 to be retrieved from the memory 107 and provided to the loudspeaker 203.

The positioning means 205 may comprise any means which may enable a position of a user 605 to be determined. In some examples the position of the user 605 may comprise the distance between the user 605 and one or more reference points. The reference points could be the position of the loudspeaker 203 or any other suitable point.

In some examples the position of the user 605 may comprise the angular orientation of the user 605. The angular orientation of the user 605 may be determined compared to a given reference point such as the loudspeaker 203 or a display or any other suitable point.

In some examples the positioning means 205 could comprise one or more electromagnetic sensors. The electromagnetic sensors could comprise infrared sensors or any other suitable type of sensors. The electromagnetic sensors may be used to determine the distance between a user 605 and a reference point and/or determine an angular orientation of the user 605. Other types of sensors may be used in other examples of the disclosure.

In some examples the positioning means 205 may be configured to infer the angular orientation of the user 605 from the position of a display or other device within a system. For instance, if the position of a display is known, or determined by the positioning means 205, it may be assumed that the user 605 is facing towards the display. The position of the display could be determined using any suitable means such as accelerometers, magnetometers or any other suitable devices. The display could be a head mounted display or any other suitable type of display.

It is to be appreciated that the device shown in FIG. 2 is an example and that other configurations of the rendering device could be provided in other examples of the disclosure. For instance the positioning means could be provided as a separate device to the rendering device 201 and could be configured to provide positioning information to the rendering device 201 via a communication link. As an example, positioning means could be provided within a head set such as an augmented reality headset. This positioning means 205 could be configured to determine the distance between the user 605 and the loudspeaker 203 and may also be used to determine an angular orientation of the user 605. This may enable the movement of the user 605 to be monitored in six degrees of freedom.

Figure 3:
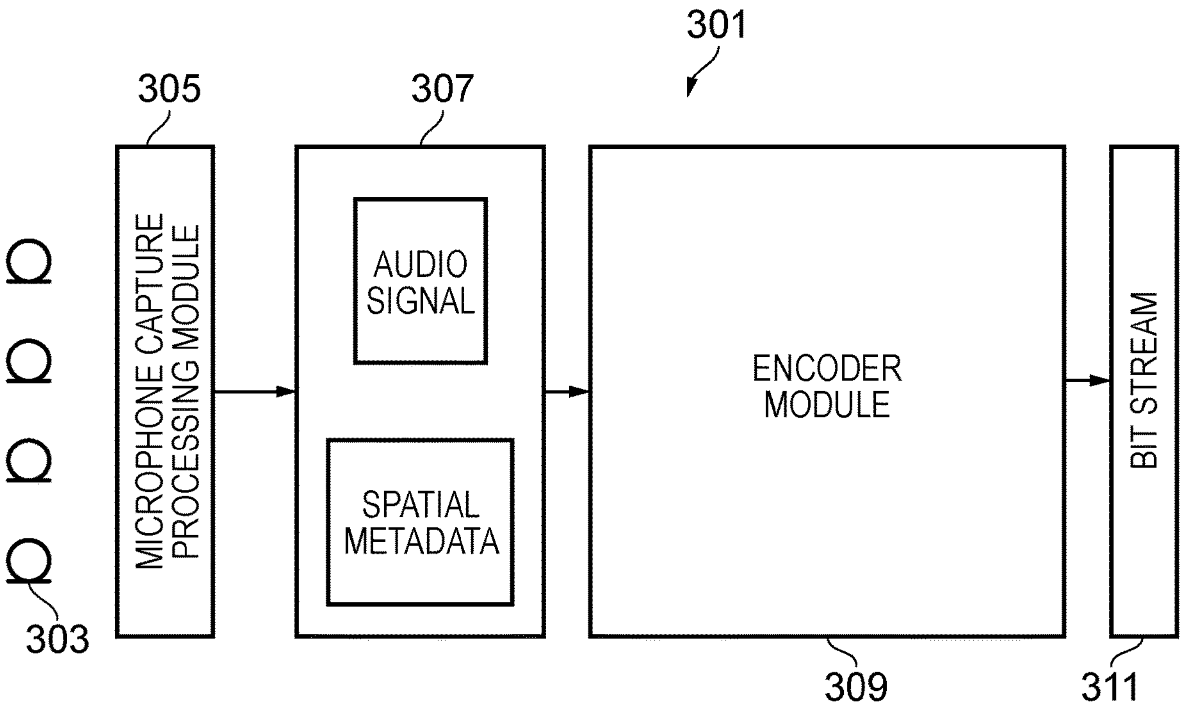
FIG. 3 shows an example audio capture system which may be used in some examples of the disclosure.

FIG. 3 shows an example system 301 which may be used to enable a band limited audio object 211 to be obtained. The example system 301 could be a spatial audio capture system. The system 301 shown in FIG. 3 could be an immersive voice and audio services (IVAS) system. Other types of spatial audio capture system could be used in other examples of the disclosure.

The system 301 comprises a plurality of microphones 303 which are configured to capture spatial audio signals. The microphones 303 could be provided in any suitable devices. For instance the microphones 303 may be provided in a mobile phone, a microphone array, a computing device or any other suitable type of microphone device. The microphones 303 may be configured to capture low frequency sounds so as to enable a band limited audio object 211 to be obtained.

The band limited audio object 211 can be obtained from the microphones using any suitable means. In some examples the band limited audio object 211 can be obtained by an audio engineer using a digital audio workstation or by any other suitable means.

The system 303 comprises a microphone capture processing module 305. The microphone capture processing module 305 is configured to process the signals captured by the plurality of microphones 303. The microphone capture processing module 305 may comprise any means which may be configured to process the signals captured by the plurality of microphones 303 so as to provide a spatial audio output signal 307. The spatial audio output signal may comprise any suitable type of spatial format such as Ambisonics, multichannel formats, plurality of channels with spatial metadata or any other suitable format.

In some examples the microphone capture processing module 305 may be configured to process the captured audio signals to create a band limited audio object 211. The microphone capture processing module 305 may also be configured to generate spatial metadata associated with the band limited audio object 211 so as to enable the spatial properties of the band limited audio object 211 to be recreated.

The spatial audio signals 307 are provided to an encoder module 309. The encoder module 309 may comprise any means which may be configured to process the spatial audio output signal 307 and any spatial metadata into a format suitable for transmission. The encoder module 309 is configured to encode and multiplex the spatial audio signal 307 and spatial metadata to a bitstream 311. The encoder module 309 provides a bitstream 311 as an output. Any suitable type of encoder module 309 could be used in examples of the disclosure. In some examples the encoder module could be an immersive voice and audio services (IVAS) encoder module 309.

In some examples the bitstream 311 could be provided to a transmitter to enable the bitstream 311 to be transmitted to a device such as the rendering device 201 shown in FIG. 2. In such examples a decoder could be provided within the rendering device 201 and configured to decode the bitstream 311. The decoder could be provided within the controller 103 of the rendering device 201. In other examples the bitstream 311 could be transmitted to a storage device such as a remote server. The remote server may be configured to enable rendering devices 201 to access the bitstream 311 from the remote server.

Figure 4:
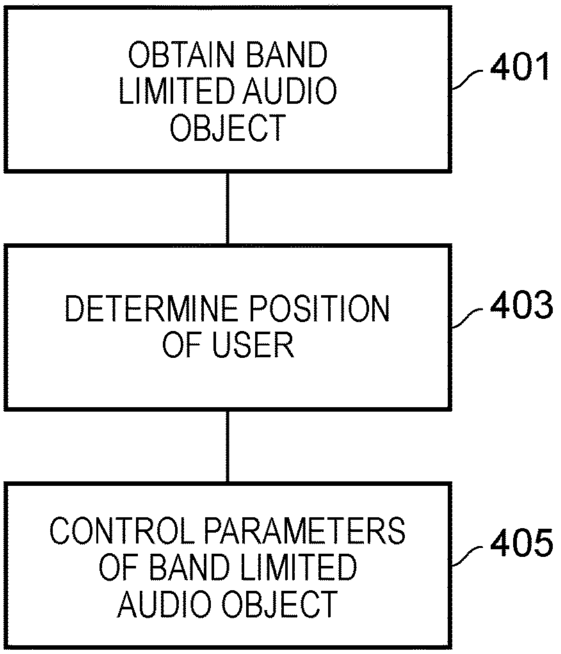
FIG. 4 shows an example method.

FIG. 4 shows an example method. The method could be implemented using apparatus 101 and rendering devices as described with reference to FIGS. 1 to 3.

The method comprises, at block 401, obtaining a band limited audio object 211 comprising one or more parameters. The band limited audio object 211 could comprise a low frequency effect audio object or any other suitable type of object. The band limited audio object 211 could be configured to be played back or rendered via at least one band limited speaker 203.

The band limited audio object 211 may comprise one or more different parameters. The parameters may enable the spatial properties of the band limited audio object 211 to be recreated. The different parameters could comprise any one or more of volume, delay, diffusivity, reverberation, position or any other parameter which affects the spatial properties of the band limited audio object 211.

The band limited audio object 211 could be obtained by any suitable means. In some examples the obtaining of the band limited audio object 211 could comprise retrieving the band limited audio object 211 from a memory 107. The memory 107 could be the memory of the rendering device 201 or the memory of a different device such as a storage device. In some examples the obtaining of the band limited audio object 211 could comprise receiving the band limited audio object 211 from a spatial audio capture system 301 such as the system shown in FIG. 3.

In some examples the method may also comprise obtaining spatial metadata. The spatial metadata may be obtained with the band limited audio object 211 or may be obtained separately from the band limited audio object 211.

At block 403 the method comprises determining a position of a user 605. Any suitable process may be used to determine the position of the user 605. In some examples the position of the user 605 could be determined by positioning means 205 which comprise part of the rendering device 201. In other examples the position of the user 605 could be determined by a remote device which then provides information indicative of the determined position to the rendering device 201.

In some examples the position of the user 605 may comprise the distance between the user 605 and one or more reference points. The reference points could be the position of the loudspeaker 203, the position of part of the rendering device 201 or any other suitable point. In some examples the position of the user 605 may comprise the angular orientation of the user 605. The angular orientation of the user 605 may be determined compared to a given reference point such as the loudspeaker 203 or a display or any other suitable point.

In some examples the position of the user 605 could be inferred from the position of a display or other part of an audio rendering system. The display could be configured to display visual images which are associated with the band limited audio object 211 and/or other audio that is being rendered. In some examples the display could be a near eye display which may be provided in a headset. The display could be used for augmented reality purposes or for any other suitable purpose.

At block 405 the method comprises using the determined position of the user 605 and the obtained spatial metadata to control at least one of the parameters of the band limited audio object 211. The control of the parameters may enable the spatial effects of the band limited audio object 211 to be recreated to correspond to the position of the user 605.

If the user 605 is moving then the way in which the parameters are controlled may be changed so as to enable the spatial effects to correspond to the movement of the user 605. The positioning means 205 may enable both the distance and orientation of a user 605 to be determined so as to enable movement of the user 605 with six degrees of freedom. This enables translation movement of the user 605 as well as rotational movement of the user 605 to be accounted for by the control of the parameters of the band limited audio object 211. The translational movement could comprise movement along any of three perpendicular axes. The rotational movement may comprise rotation about any of three perpendicular axes.

In some examples spatial metadata may be used to control the parameters of the band limited audio object 211. The spatial metadata may be obtained with the band limited audio object 211. The spatial metadata may comprise information indicating how the parameters should be varied in dependence upon the position of the user 605.

In examples of the disclosure the position of the user 605 may be determined while the band limited audio object 211 is being played back. That is, the position of the user 605 may be determined while the band limited audio object 211 is being rendered by the one or more loudspeakers 203. This may enable the current position of the user 605 to be determined and may enable the parameters of the band limited audio object 211 to be controlled so as to account for movement of the user 605.

Figure 5:
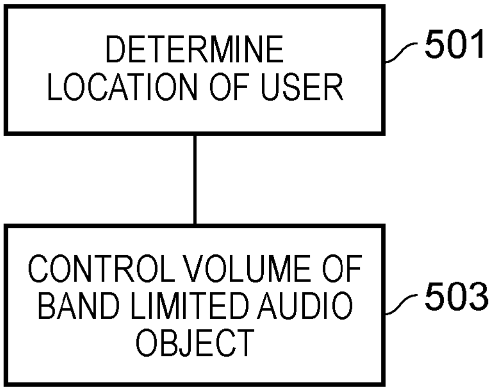
FIG. 5 shows another example method.

FIG. 5 shows another method which shows an example implementation of the disclosure.

At block 501 the location of a user 605 is determined. The location of the user 605 may be determined relative to components of an audio rendering system. For example the location of one or more speakers 203 may be known. The location of the speakers 203 may be known from calibration data of the audio rendering system or from measurements made by a suitable positioning means or by any other suitable process.

The position of the band limited audio object 211 may also be determined. The position of the band limited audio object 211 may be determined from spatial metadata which may be stored with, or otherwise associated with, the band limited audio object 211. The position of the band limited audio object 211 could be a virtual position which represents the position of the band limited audio object 211 in a virtual audio space. This may determine the position in which a user 605 perceives the band limited audio object 211 to be located or to originate from. The position may be determined by the location of a sound source when the sound was being captured. The position may also be affected by other factors which affect the directionality of sound such as the presence of walls and other features which may reflect or divert sound.

At block 503 the volume of the band limited audio object 211 is controlled based on the determined location of the user 605. The positions of the speakers 203 and the virtual position of the band limited audio object 211 may also be used to control the volume of the band limited audio object 211. For instance if the user 605 moves closer to the virtual position of the band limited audio object 211 then the volume of the band limited audio object 211 may be increased while if the user 605 moves further away from the virtual position of the band limited audio object 211 then the volume of the band limited audio object 211 may be decreased.

The positions of the speakers within the audio rendering system may also be taken into account while the volume is being controlled. For example it may be determined if the user 605 is moving towards a speaker 203 rendering the band limited audio object 211 or away from a speaker 203 rendering the band limited audio object 211 and the volume can be controlled as needed.

Figure 6:
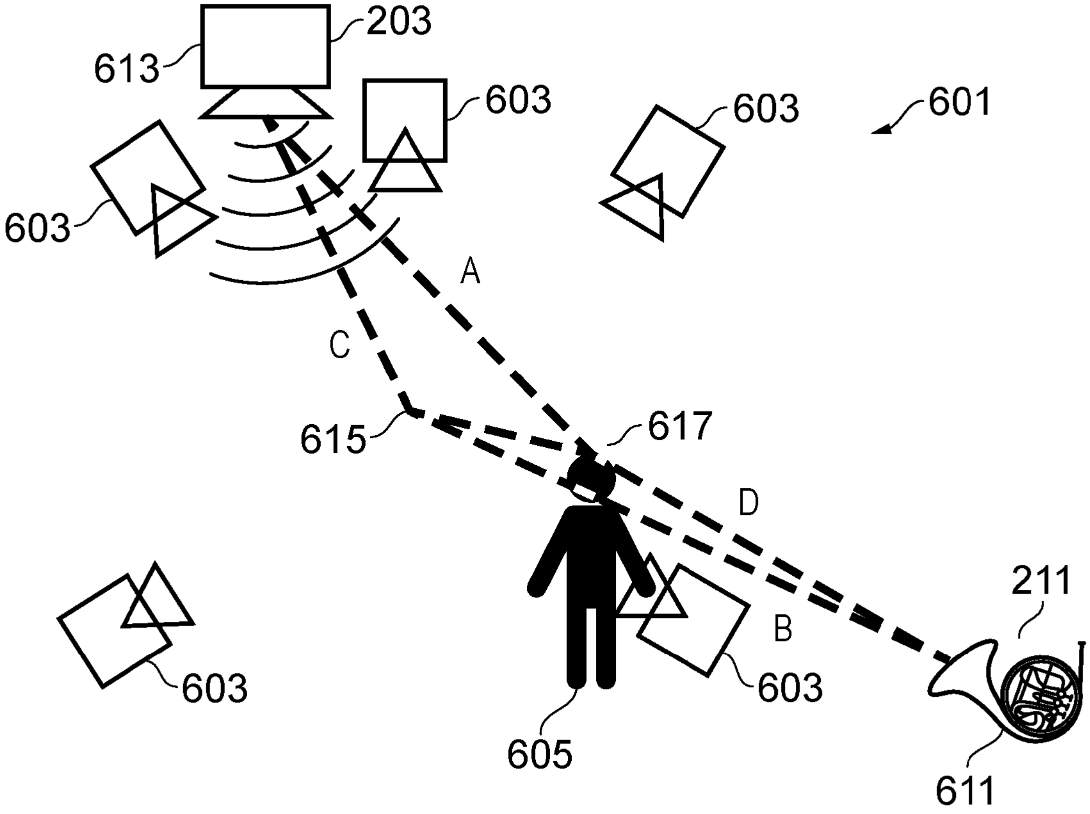
FIG. 6 shows an example audio rendering system.

FIG. 6 shows an example audio rendering system 601 which is being used to implement the method as shown in FIG. 5. The audio rendering system 601 could also be used to implement other variations of the method. For instance, in the example of FIGS. 5 and 6 the volume of the band limited audio object 211 is being controlled however in other examples of the disclosure other parameters of the band limited audio object 211 could be controlled instead of, or in addition to, the volume.

The audio rendering system 601 comprises a plurality of loudspeakers 203, 603. The audio rendering system 601 comprises a plurality of non-band limited speakers 603 and a band limited speaker 203. The non-band limited speakers 603 may be configured to render non-band limited audio objects. The band limited speaker 203 may be configured to render band limited audio objects 211. In the example of FIG. 6 the audio rendering system 601 comprises five non-band limited speakers 603 and one band limited speaker 203. Other numbers of speakers 203, 603 could be used in other implementations of the disclosure.

In the example of FIG. 6 the plurality of loudspeakers 203, 603 are spatially distributed so as to enable spatial audio to be provided to a user 605 who is positioned in an area among the plurality of loudspeakers 203, 603. The spatial distribution of the plurality of loudspeakers 203, 603 enables a virtual audio space to be recreated for the user 605. In the example shown in FIG. 6 the plurality of loudspeakers 203, 603 are all positioned on the same vertical level. In other examples the plurality of loudspeakers 203, 603 could be provided on different vertical levels. For instance some of the plurality of loudspeakers 203, 603 could be provided above the user 605 and some of the plurality of loudspeakers 203, 603 could be provided below the user 605.

In the example of FIG. 6 the virtual audio space that is recreated comprises a band limited audio object 211. In the example of FIG. 6 the band limited audio object may comprise the audio generated by a musical instrument. Other means for generating band limited audio objects 211 could be used in other examples of the disclosure. The virtual audio space may also comprise other non-band limited audio objects which are rendered by the non-band limited speakers 603.

The apparatus 101 for controlling the parameters of the band limited audio object 211 could be provided at any suitable position within the audio rendering system. In some examples the apparatus 101 could be provided within the band limited speaker 203.

The band limited audio object 211 is located in a first location 611 within the virtual audio space. In the example of FIG. 6 the first location is behind the user 605 and also behind one of the non-band limited speakers 603. It is to be appreciated that the band limited audio object 211 could be located in other locations in other examples of the disclosure.

The band limited audio object 211 could comprise a mono signal or a stereo signal. In the example of FIG. 6 where only a single band limited speaker 203 is provided, a stereo signal may be down mixed before it is rendered by the single band limited speaker 203.

The band limited speaker 203 is positioned at a second location 613 within the audio rendering system 601. The second location 613 may be different to the first location 611. In the example audio rendering system 601 of FIG. 6 the band limited speaker 203 is positioned adjacent to two of the non-band limited speakers 603. Other locations for the band limited speaker 203 could be used in other examples of the disclosure.

In the example of FIG. 6 the user 605 is free to move about within the space covered by the audio rendering system 601. The user 605 may be free to move in six degrees of freedom. That is, the user 605 can move laterally as well as change their orientation. This will cause the user 605 to change how close they are to the speakers 603, 203 within the audio rendering system 601.

While the user 605 is moving the user 605 could also be consuming additional content related to the audio. For example the user 605 could be using augmented reality content or virtual reality content which may comprise images as well as audio. The images could be rendered on a near eye display which could be provided in a head set or any other suitable type of display.

The movement of the user 605 could be tracked using any suitable means. In some examples one or more of the speakers 203, 603 could comprise positioning means 205 which enables the distance between the user 605 and one or more of the speakers 203, 603 to be determined. In some examples a device such as a head set which can be worn by the user 605 may comprise positioning means which may be configured to track the movements of the user 605.

In the example of FIG. 6 the user is shown in a current location 617. The current location 615 is different to a calibrated location 615. It is to be appreciated that these locations 615, 617 are shown as an examples and that the user could be free to move between any locations and in any directions within the audio rendering system 601.

The calibrated location 615 may be a central position within the audio rendering system 601. The speakers 603, 203 may be calibrated so that when the user 605 is in this calibrated location 615 the level of sound coming from each of the speakers 203, 603 is the same. The calibrated location 615 may be an optimal position for listening to the sound rendered by the audio rendering system 601.

When the user 605 is in the calibrated location 615 the gain applied to the band limited audio object 211 is indicated by the metadata 213 associated with the band limited audio object 211. In the example of FIG. 6 the calibrated location 615 is an optimal location so the gain that is applied could be 1.0. When the user 605 moves from this calibrated location 615 the gain applied to the band limited audio object 211 will either increase or decrease. The metadata 213 associated with the band limited audio object 211 may indicate how the gain should be varied in dependence upon the user's location.

When the user 605 changes location the gain that is applied to the band limited audio object 211 may be determined based both on the distance between the user 605 and the band limited audio object 211 and also the distance between the user 605 and the band limited audio speaker 203. For instance, in the example of FIG. 6, as the user 605 has moved from the calibration location 615 to the current location 617 they have moved further away from the band limited speaker 203 but closer to the location 611 of the band limited audio object 211. If no change is applied to the band limited audio object 211 then the user 605 would perceive the band limited audio object 211 to be quieter because they are now further away from the band limited speaker. Therefore, in order to enable the user 605 to correctly perceived the location of the band limited audio object 211 the volume of the band limited audio object 211 must be increased. In some examples the gain that is applied to the band limited audio object 211 may be given by $$\frac{|A|}{|C|}\frac{|B|}{|D|}$$

Where A is the distance between the band limited speaker 203 and the current location 617 of the user, B is the distance between the band limited audio object 211 and the calibrated location 615, C is the distance between the band limited speaker 203 and the calibrated location 615 and D is the distance between the band limited audio object 211 and the current location 617 of the user 605.

Figure 7:
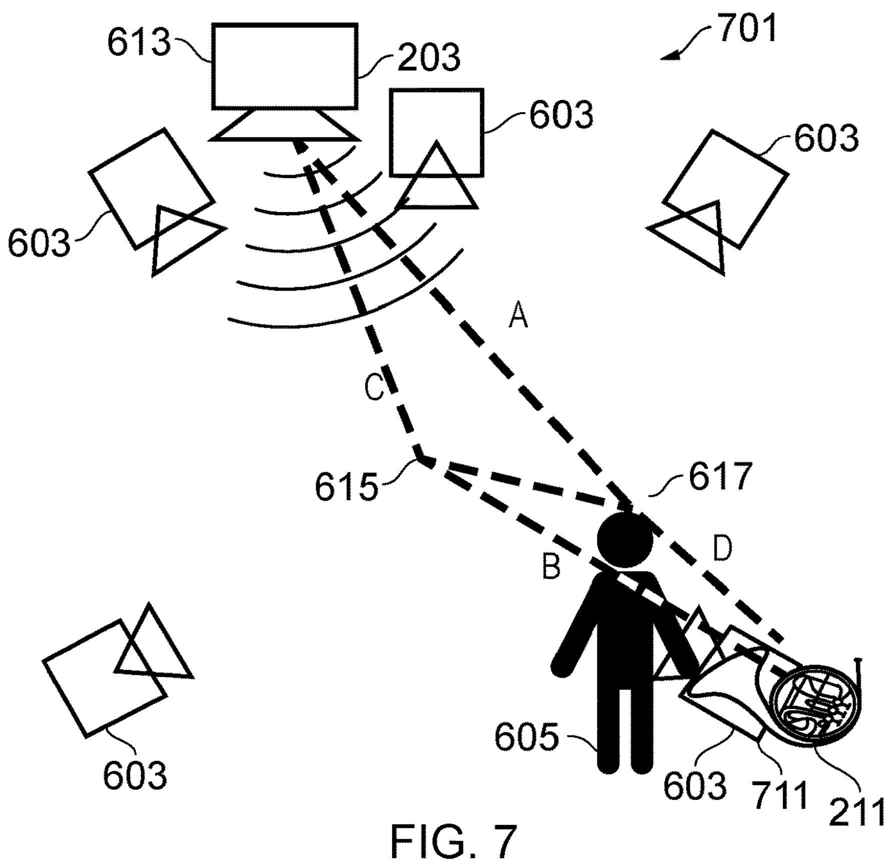
FIG. 7 shows another example audio rendering system.

FIG. 7 shows another example audio rendering system 701. The audio rendering system 701 of FIG. 7 is similar to the audio rendering system 601 shown in FIG. 6 in that it comprises the same arrangement of non-band limited speakers 603 and a band limited audio speaker 203 and that the user 605 is able to move around among the arrangement of speakers 203, 603. Corresponding reference numerals are used for corresponding features.

In the example audio rendering system 701 of FIG. 7 the location of the band limited audio object 211 is not known. For example the metadata 213 associated with the band limited audio object 211 might not comprise any information indicative of the location of the band limited audio object 211. In this case an approximation or estimate of the location of the band limited audio object 211 may be used. In some examples the location of the band limited audio object 211 may be assumed to be the same as the speakers 203, 603. In some examples the location of the band limited audio object 211 could be taken to be an average between the speakers 203, 603 and the calibration location 615. In some examples the location of the band limited audio object 211 could be taken to be the location of the nearest speaker 603, 203 the calibration location 615. Other estimations or approximations may be used in other examples of the disclosure.

In the example show in FIG. 7 the location 711 of the band limited audio object 211 is assumed to be the location of the nearest speaker 603, 203 the calibration location 615. In this case the band limited audio object 211 is still located behind the user 605 while the band limited speaker 203 is located in front of the user. The gain that is to be applied to the band limited audio object 211 is given by $$\frac{|A|}{|C|}\frac{|B|}{|D|}$$

Where A is the distance between the band limited speaker 203 and the current location 617 of the user, B is the distance between the location of the nearest speaker 603 and the calibrated location 615, C is the distance between the band limited speaker 203 and the calibrated location 615 and D is the distance between the nearest speaker 603 and the current location 617 of the user 605.

Figure 8:
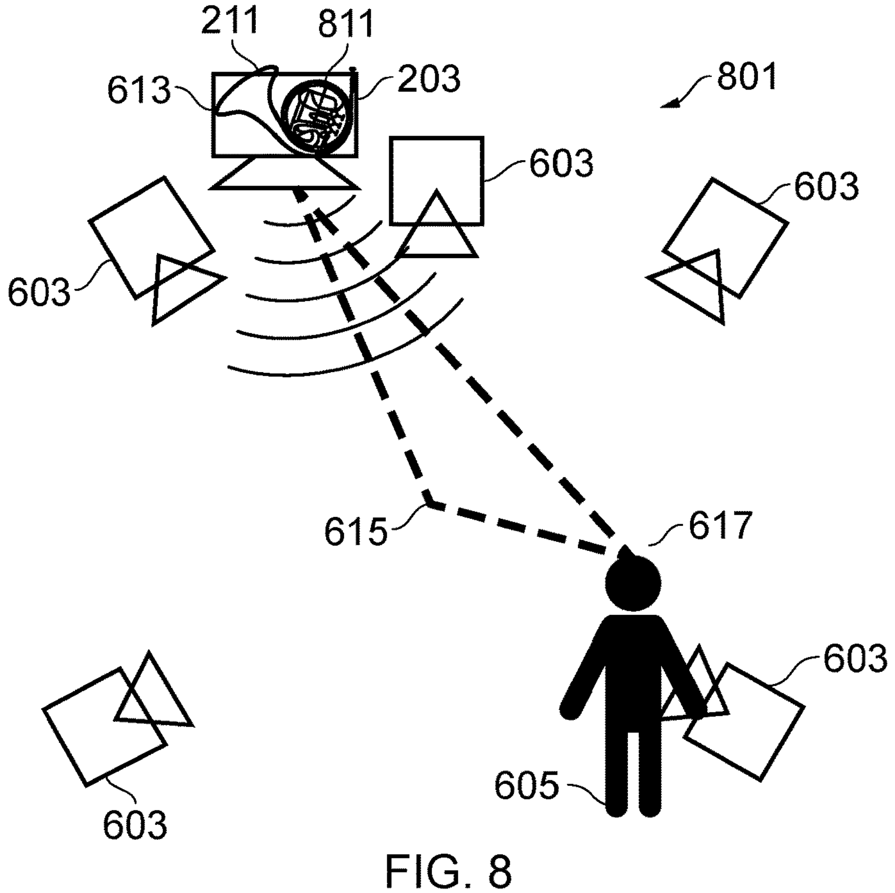
FIG. 8 shows another example audio rendering system.

FIG. 8 shows another example audio rendering system 801. The audio rendering system 801 of FIG. 8 is similar to the audio rendering systems 601, 701 shown in FIGS. 6 and 7 in that it comprises the same arrangement of non-band limited speakers 603 and a band limited audio speaker 203 and that the user 605 is able to move around among the arrangement of speakers 203, 603. Corresponding reference numerals are used for corresponding features.

In the example audio rendering system 801 of FIG. 8 the location of the band limited audio object 211 is not known. For example the metadata 213 associated with the band limited audio object 211 might not comprise any information indicative of the location of the band limited audio object 211. In the example shown in FIG. 8 the location 811 of the band limited audio object 211 is assumed to be the location of the band limited speaker 203. In this case the band limited audio object 211 is located in front of the user 605. In such cases it may be determined that the gain of the band limited audio object 211 does not be changed as the user 605 moves because the change in distance between the band limited speaker 203 and the user 605 will result in the correct change in volume being perceived. In such cases the metadata 213 associated with the band limited audio object 211 may indicate that the gain that should be applied to the band limited audio object 211 has a value of 1.

Figure 9:
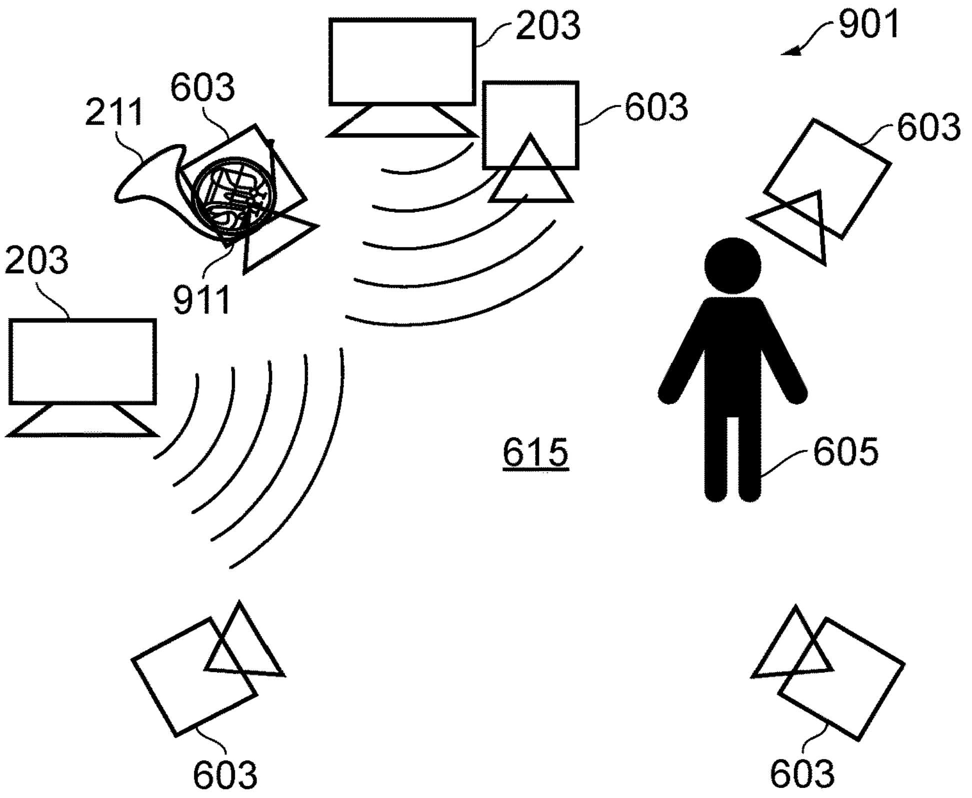
FIG. 9 shows another example audio rendering system.

FIG. 9 shows another example audio rendering system 901. The audio rendering system 901 of FIG. 9 is similar to the audio rendering systems 601, 701, 801 shown in FIGS. 6, 7 and 8 in that it comprises an arrangement of non-band limited speakers 603 and band limited audio speakers 203 and that the user 605 is able to move around among the arrangement of speakers 203, 603. However, the audio rendering system 901 is different because in the example of FIG. 9 the audio rendering system 901 comprises two band limited audio speakers 203. Corresponding reference numerals are used for corresponding features.

In the example of FIG. 9 the location 911 of the band limited audio object 211 is determined to be between the two band limited speakers. In such examples the volume of the band limited audio object 211 does not need to be changed as the user moves within the audio rendering system 901. The metadata 213 associated with the band limited audio object 211 may provide an indication that the volume of the band limited audio object 211 does not need to be changed.

Figure 10:
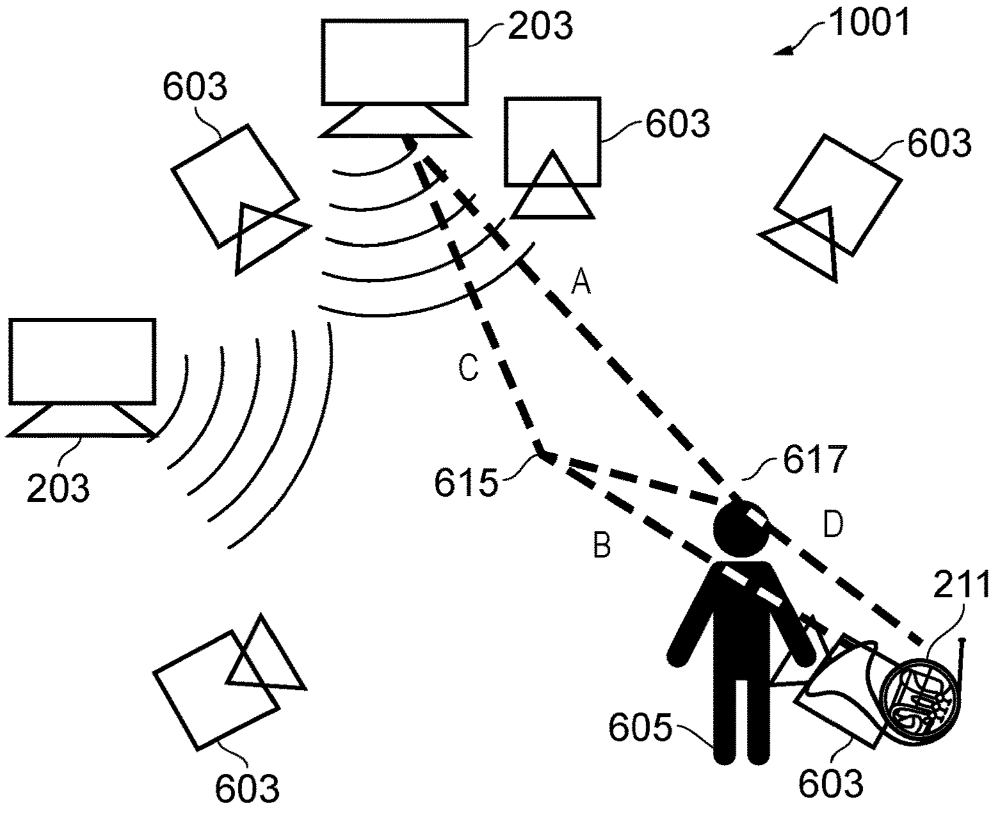
FIG. 10 shows another example audio rendering system.

FIG. 10 shows another example audio rendering system 1001. The audio rendering system 1001 of FIG. 10 is similar to the audio rendering system 901 shown in FIG. 9 in that it comprises the same arrangement of non-band limited speakers 603 and two band limited audio speakers 203 and that the user 605 is able to move around among the arrangement of speakers 203, 603. Corresponding reference numerals are used for corresponding features.

In the example of FIG. 10 the location of the band limited audio object 211 is determined to be behind the user 605. This location is not between the two band limited speakers 203. In such examples the band limited speakers 203 are controlled so that the band limited audio object 211 is only rendered through one of the band limited speakers. The equations for determining the value of the gain to be applied by the single band limited speaker 203 can be used as described above. It is to be appreciated that either of the band limited speakers 203 could be used to render the band limited audio object 211.

In the examples of FIGS. 5 to 10 the parameter of the band limited audio object 211 that is controlled is the volume. The volume could be the loudness or the gain applied to the band limited audio object 211. It is to be appreciated that other parameters of the band limited audio object 211 may be controlled instead of, or in addition to the volume of the band limited audio object 211. For instance the delay, diffusivity, reverberation or any other suitable parameter could be changed instead of, or in addition to, the volume.

Figure 11:
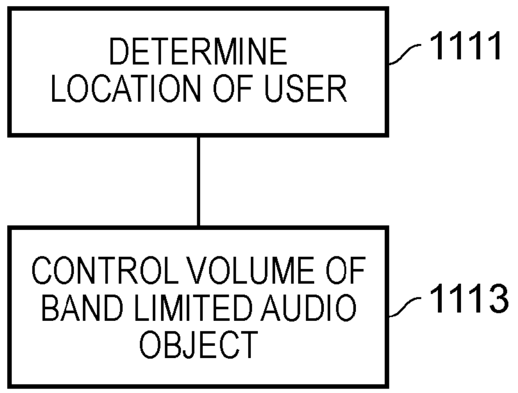
FIG. 11 shows another example method.

FIG. 11 shows another method which shows an example implementation of the disclosure.

At block 1111 the location of a user 605 is determined. The location of the user 605 may be determined relative to components of an audio rendering system. For example the location of one or more speakers 203, 603 may be known. The one or more speakers could be band limited speakers 203. In some examples the speakers 203 could also include non-band limited speakers 603. The location of the speakers 203, 603 may be known from calibration data of the audio rendering system or from measurements made by a suitable positioning means or by any other suitable process.

The position of the band limited audio object 211 may also be determined. The position of the band limited audio object 211 may be determined from spatial metadata which may be stored with, or otherwise associated with, the band limited audio object 211. The position of the band limited audio object 211 could be a virtual position which represents the position of the band limited audio object 211 in a virtual audio space. This may determine the position in which a user 605 perceives the band limited audio object 211 to be located or to originate from. The position may be determined by the location of a sound source when the sound was being captured. The position may also be affected by other factors which affect the directionality of sound such as the presence of walls and other features which may reflect or divert sound.

At block 1113 the delay of the band limited audio object 211 is controlled based on the determined location of the user 605. The positions of the speakers 203, 603 and the virtual position of the band limited audio object 211 may also be used to control the delay of the band limited audio object 211. The delay of the band limited audio object 211 could be the delay as compared to other non-band limited audio objects which be being rendered at the same time as the band limited audio object 211.

Figure 12:
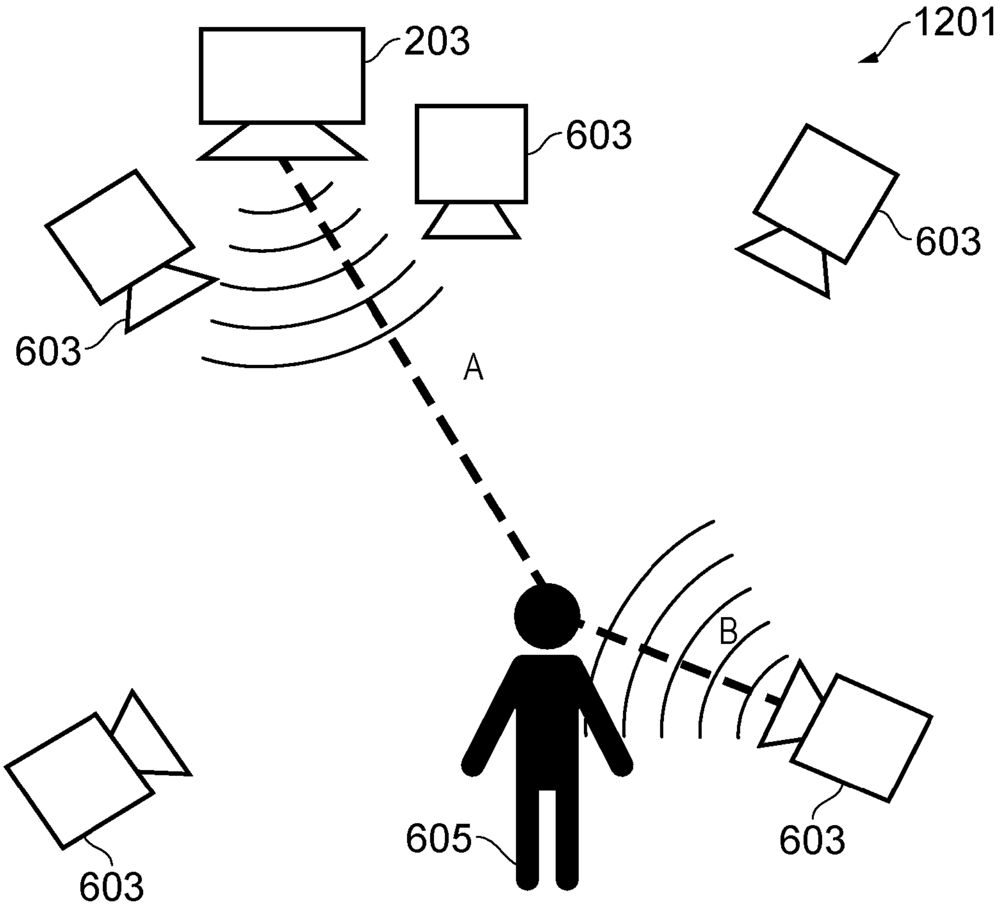
FIG. 12 shows another example audio rendering system.

FIG. 12 shows another example audio rendering system 1201 which could be used to implement the method of FIG. 11.

The audio rendering system 1201 of FIG. 12 is similar to the audio rendering system 601 shown in FIG. 6 in that it comprises the same arrangement of non-band limited speakers 603 and a band limited audio speaker 203 and that the user 605 is able to move around among the arrangement of speakers 203, 603. Corresponding reference numerals are used for corresponding features.

In the example audio rendering system 1201 of FIG. 12 a band limited audio object 211 is being rendered by the band limited speaker 203 and a non-band limited audio object is being rendered by one of the non-band limited speakers 603. The band limited audio object 211 and the non-band limited audio object may be being rendered at the same time. The band limited speaker 203 is positioned in front of the user 603 and the non-band limited speaker 603 which is rendering the non-band limited audio object is provided behind the user 605. The positions of the speakers 203, 603 are such that if a user 605 moves towards the band limited speaker 203 they move away from the non-band limited speaker 603 and if the user 605 moves towards the band limited speaker 203 then they move away from the band limited speaker 203. In such cases the metadata 213 associated with either the band limited audio object 211 or the non-band limited audio object comprises information which indicates how the delay should be adjusted so as to take this change in position of the user 605 into account.

In the example shown in FIG. 12 the user 605 is positioned closer to the non-band limited speaker 603 than to the band limited speaker 203. In this case a delay has to be added to the non-band limited object or the band limited audio object 211 has to be advanced. Conversely if the user 605 was positioned closer to the band limited speaker 203 than to the non-band limited speaker 603 then the delay would need to be added to the band limited audio object 211 or the non-band limited audio object would need to be advanced. In some examples a small delay could be added to one of the audio objects while a small advance could be applied to the other. The addition of the delay changes the delay between the band limited audio object 211 and the non-band limited audio object.

In some examples the delay that is applied to the band limited audio object 211 may be given by $$\frac{|A|-|B|}{c}$$

Where A is the distance between the user 605 and the band limited speaker 203, B is the distance between the user 605 and the non-band limited speaker 603 and c is the speed of sound. The speed of sound may be estimated as 340 m/s.

In some examples the audio rendering system 1201 may be calibrated so that the audio from each of the speakers 203, 603 is synchronised to arrive at the same time to a calibration location 615. The calibration location 615 could be a central location within the audio rendering system 1201. The delay that is added in the examples of the disclosure could be added in addition to this calibration delay.

The delay that is added in the examples shown in FIGS. 11 and 12 could be added in addition to the volume control shown in FIGS. 5 to 10. It is to be appreciated that other parameters of the band limited audio object could also be controlled.

Figure 13:
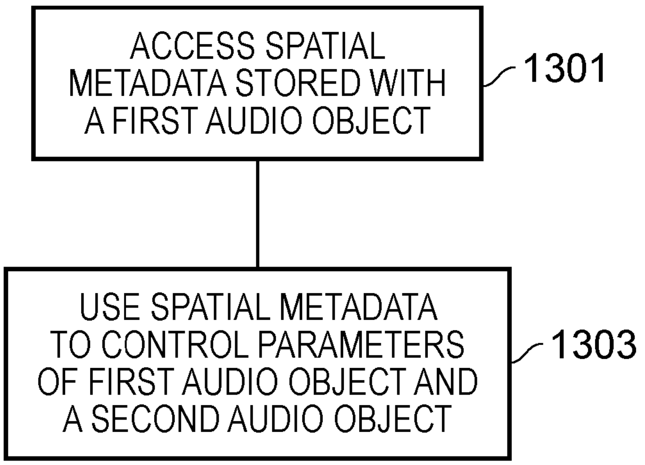
FIG. 13 shows another example method.

FIG. 13 shows another method which shows an example implementation of the disclosure. The method of FIG. 13 could be implemented using any of the systems and apparatus 101 as shown above. In some examples the method shown in FIG. 13 could be applied at the same time as the other example methods described in this description.

At block 1301 spatial metadata stored with a first audio object is accessed. In some examples the spatial metadata may be stored with a non-band limited audio object but may be needed in order to enable a band limited audio object 211 to be rendered. The non-band limited audio object and the band limited audio object 211 could be associated with each other in that they represent the same or similar sound sources, they may come from the same or similar direction, they may be played back simultaneously to create a spatial audio space or there may be any other suitable connection.

In such cases metadata 213 indicative of the non-band limited audio object may be stored with a band limited audio object 211. The metadata 213 obtained with the band limited audio object 211 may be indicative of the connection between the band limited audio object 211 and the non-band limited audio object. The metadata 213 indicative of the audio object or the connection between the audio objects could be an integer which represents the audio object. In such examples each of the audio objects could be assigned a reference integer.

The metadata 213 obtained with the band limited audio object 211 may therefore enable the spatial metadata to be accessed even though the spatial metadata may be stored with a different audio object.

At block 1303 the spatial metadata is used to control parameters of both a first audio object and the second audio object. The first audio object could be the non-band limited audio object and the second audio object could be the band limited audio object 211. In some examples the spatial metadata could be used to control the parameters of more than two audio objects. The spatial metadata can be used to control the parameters of the different audio objects simultaneously.

In the example described above the spatial metadata is stored with the non-band limited audio object and the band limited audio object 211 is stored with metadata 213 which indicates how to access the stored spatial metadata. In other examples the spatial metadata could be stored with the band limited audio object 211 while the metadata 213 stored with the non-band limited audio object could be used to retrieve the spatial metadata as needed.

The method of FIG. 13 provides the technical effect that it reduces the amount of metadata 213 that needs to be stored and/or transmitted. This may provide for more efficient audio rendering systems.

Figure 14:
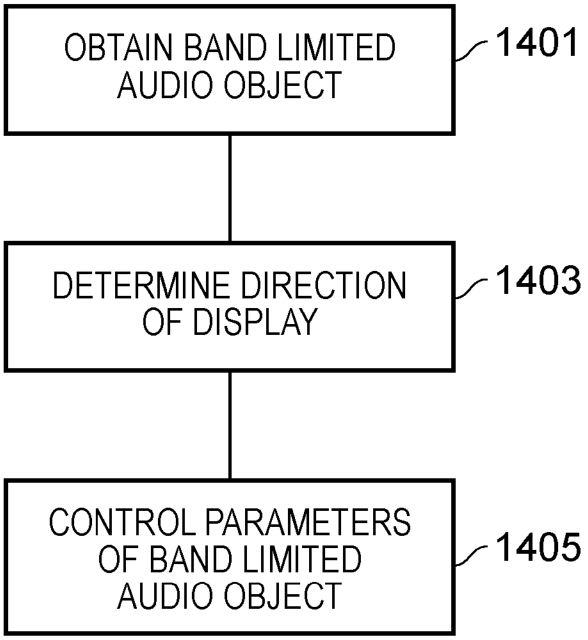
FIG. 14 shows another example method.

FIG. 14 shows another method which shows an example implementation of the disclosure.

The method comprises, at block 1401, obtaining a band limited audio object 211 comprising one or more parameters. The band limited audio object 211 could comprise a low frequency effect audio object or any other suitable type of object. The band limited audio object 211 could be configured to be played back or rendered via at least one band limited speaker 203.

The band limited audio object 211 may comprise one or more different parameters. The parameters may enable the spatial properties of the band limited audio object 211 to be recreated. The different parameters could comprise any one or more of volume, delay, diffusivity, reverberation or any other parameter which affects the spatial properties of the band limited audio object 211. The volume could be the loudness or the gain applied to the band limited audio object 211.

The band limited audio object 211 could be obtained by any suitable means. In some examples the obtaining of the band limited audio object 211 could comprise retrieving the band limited audio object 211 from a memory 107. The memory 107 could be the memory of the rendering device 201 or the memory of a different device such as a storage device. In some examples the obtaining of the band limited audio object 211 could comprise receiving the band limited audio object 211 from a spatial audio capture system 301 such as the system shown in FIG. 3.

At block 1403 the method comprises determining a direction of a display associated with the band limited audio object 211. The display could be a display on which visual content associated with the band limited audio object 211 is being displayed. It may be assumed that the user 605 viewing the content on the display is positioned so that they are facing towards the display.

The display could be a near eye display which could be provided within a headset or other similar device. In such examples the direction of the display may change as the user 605 rotates their head and/or body.

In some examples the display could be provided within a handheld device such as mobile telephone. In such examples the user 605 could tilt or otherwise change the direction of the hand held device while they are viewing content displayed on the display.

The direction of the display could be determined using positioning means 205. The positioning means could comprise accelerometers, magnetometers or any other suitable means which could be configured to determine the direction of the display.

In some examples the method may also comprise obtaining spatial metadata. The spatial metadata may be obtained with the band limited audio object 211 or may be obtained separately from the band limited audio object 211.

At block 1403 the method comprises using spatial metadata associated with the band limited audio object 211 to control one or more parameters of the band limited audio object 211 in accordance with the determined direction of the display. The one or more parameters that are controlled could comprise the volume or any other suitable parameter.

As an example the band limited speaker 203 in an audio rendering system may only cover a limited angular range. The angular range of the band limited speaker 203 may be limited compared to non-band limited speakers 603. The angular range of the band limited speaker 203 may be limited in that it does not cover the entire angular range within which the display could be directed.

If it is determined that the direction of the display is within a threshold range then the band limited audio object 211 may be controlled so that no change is made to the parameters of the band limited audio object 211. The threshold range could comprise an angular range that corresponds to the user 605 being positioned within the angular range covered by the band limited speaker 203.

If it is determined that the direction of the display is outside of the threshold range then the band limited audio object 211 may be controlled as indicated by the spatial metadata. If the direction is determined to be outside of the threshold range then this could correspond to the user being positioned outside of the angular range covered by the band limited speaker 203. In which case the parameters of the band limited audio object 211 so that the spatial effects of the band limited audio object 211 can be recreated for the user 605. For instance the volume of the band limited audio object 211 may be decreased if it is determined that the display is outside of the threshold range. This could recreate the spatial effect of the band limited audio object 211 being position behind or towards the back of the user 605.

Examples of the disclosure provide the technical effect of enabling the spatial aspect of band limited audio objects 211 to be recreated. As a user's spatial awareness of the band limited audio objects 211 may be lower than their awareness of the non-band limited audio objects this enable different methods of providing the spatial effects to be used.

The blocks illustrated in the FIGS. 4, 5, 13 and 14 may represent steps in a method and/or sections of code in the computer program 109. The illustration of a particular order to the blocks does not necessarily imply that there is a required or preferred order for the blocks and the order and arrangement of the block may be varied. Furthermore, it may be possible for some blocks to be omitted.

In this application the term coupled means operationally coupled. Any number or combination of intervening elements can exist between coupled elements, including no intervening elements.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to 'comprising only one . . . ' or by using 'consisting'.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning.

That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature) or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
- at least one processor; and
- at least one memory storing instructions that, when executed with the at least one processor, cause the apparatus to:
  - obtain a low frequency effect audio object comprising one or more parameters, wherein the low frequency effect audio object is limited to a low frequency range, wherein the low frequency effect audio object is configured to be rendered via at least one loudspeaker configured to provide a low frequency effect audible output signal, wherein the one or more parameters comprise at least one of: volume, delay, reverberation, or diffusivity;
  - obtain metadata indicative of a non-band limited audio object associated with the low frequency effect audio object;
  - obtain spatial metadata that is associated with the low frequency effect audio object based at least partially on the metadata indicative of the non-band limited audio object;
  - determine a position of a user relative to the at least one loudspeaker, wherein the position of the user is associated with six degrees of freedom in which movement is enabled; and
  - use the determined position of the user and the spatial metadata to dynamically control at least one of the one or more parameters of the low frequency effect audio object for audio rendering with six degrees of freedom.

2. The apparatus as claimed in claim 1, wherein the spatial metadata is stored with the non-band limited audio object.

3. The apparatus as claimed in claim 2, wherein the metadata is indicative of a connection between the low frequency effect audio object and the non-band limited audio object.

4. The apparatus as claimed in claim 2, wherein the low frequency effect audio object and the non-band limited audio object are configured to be played at a same time.

5. The apparatus as claimed in claim 1, wherein the low frequency effect audio object comprises at least one of:
- a band limited audio object playback volume; or
- a band limited audio object playback signal.

6. The apparatus as claimed in claim 1, wherein determining the position of the user relative to the at least one loudspeaker comprises the at least one memory stores instructions that, when executed with the at least one processor, cause the apparatus to at least one of:
- determine the position of the user while the low frequency effect audio object is being played; or
- determine a distance between the user and the at least one loudspeaker.

7. A method comprising:
- obtaining a low frequency effect audio object comprising one or more parameters, wherein the low frequency effect audio object is limited to a low frequency range, wherein the low frequency effect audio object is configured to be rendered via at least one at least one configured to provide a low frequency effect audible output signal, wherein the one or more parameters comprise at least one of: volume, delay, reverberation, or diffusivity;
- obtaining metadata indicative of a non-band limited audio object associated with the low frequency effect audio object;
- obtaining spatial metadata that is associated with the low frequency effect audio object based at least partially on the metadata indicative of the non-band limited audio object;
- determining a position of a user relative to the at least one loudspeaker, wherein the position of the user is associated with six degrees of freedom in which movement is enabled; and
- using the determined position of the user and the spatial metadata to dynamically control at least one of the one or more parameters of the low frequency effect audio object for audio rendering with six degrees of freedom.

8. The method as claimed in claim 7, wherein the determining of the position of the user comprises at least one of:

determining the position of the user while the low frequency effect audio object is played; or determining a distance between the user and the at least one loudspeaker.

9. The method as claimed in claim 7, wherein the low frequency effect audio object comprises at least one of:

a band limited audio object playback volume; or a band limited audio object playback signal.

10. The method as claimed in claim 7, wherein the spatial metadata is stored with the non-band limited audio object.

11. The method as claimed in claim 10, wherein the metadata is indicative of a connection between the low frequency effect audio object and the non-band limited audio object.

12. The method as claimed in claim 10, wherein the low frequency effect audio object and the non-band limited audio object are configured to be played at a same time.

13. An apparatus comprising:

at least one processor; and at least one memory storing instructions that, when executed with the at least one processor, cause the apparatus to:

obtain a low frequency effect audio object comprising one or more parameters, wherein the low frequency effect audio object is limited to a low frequency range, wherein the low frequency effect audio object is configured to be rendered via at least one loudspeaker configured to provide a low frequency effect audible output signal, wherein the one or more parameters comprise at least one of: volume, delay, reverberation, or diffusivity;

obtain metadata indicative of a non-band limited audio object associated with the low frequency effect audio object;

obtain spatial metadata associated with the low frequency effect audio object based at least partially on the metadata indicative of the non-band limited audio object;

determine a direction of a display, associated with the low frequency effect audio object, relative to the at least one loudspeaker; and use the spatial metadata to dynamically control at least one of the one or more parameters of the low frequency effect audio object, in accordance with the determined direction of the display relative to the at least one loudspeaker, for audio rendering.

14. The apparatus as claimed in claim 13, wherein the one or more parameters comprises the volume.

15. The apparatus as claimed in claim 13, wherein the at least one memory stores instructions that, when executed with the at least one processor, cause the apparatus to:

determine whether the display is oriented within a threshold angular range, wherein the threshold angular range is defined with the spatial metadata.

16. The apparatus as claimed in claim 15, wherein the at least one memory stores instructions that, when executed with the at least one processor, cause the apparatus to at least one of:

control at least one of the one or more parameters of the low frequency effect audio object in a first way in response to the display being oriented within the threshold angular range; or control at least one of the one or more parameters of the low frequency effect audio object in a second way in response to the display not being oriented within the threshold angular range.

17. A method comprising:

obtaining a low frequency effect audio object comprising one or more parameters, wherein the low frequency effect audio object is limited to a low frequency range, wherein the low frequency effect audio object is configured to be rendered via at least one loudspeaker configured to provide a low frequency effect audible output signal, wherein the one or more parameters comprise at least one of: volume, delay, reverberation, or diffusivity;

obtaining metadata indicative of a non-band limited audio object associated with the low frequency effect audio object;

obtaining spatial metadata associated with the low frequency effect audio object based at least partially on the metadata indicative of the non-band limited audio object;

determining a direction of a display, associated with the low frequency effect audio object, relative to the at least one loudspeaker; and using the spatial metadata to dynamically control at least one of the one or more parameters of the low frequency effect audio object, in accordance with the determined direction of the display relative to the at least one loudspeaker, for audio rendering.

18. The method as claimed in claim 17, wherein the one or more parameters comprises the volume.

* * * * *